United States Patent
Hwang

(10) Patent No.: US 10,276,023 B2
(45) Date of Patent: Apr. 30, 2019

(54) MOBILE DEVICE AND NOTIFICATION OUTPUT METHOD

(71) Applicant: FUTUREPLAY INC., Seoul (KR)

(72) Inventor: Sungjae Hwang, Seoul (KR)

(73) Assignee: FUTUREPLAY INC., Seoul (KR)

( * ) Notice: Subject to any disclaimer, the term of this patent is extended or adjusted under 35 U.S.C. 154(b) by 0 days.

(21) Appl. No.: 15/558,195

(22) PCT Filed: Mar. 15, 2016

(86) PCT No.: PCT/KR2016/002539
§ 371 (c)(1),
(2) Date: Sep. 14, 2017

(87) PCT Pub. No.: WO2016/148474
PCT Pub. Date: Sep. 22, 2016

(65) Prior Publication Data
US 2018/0068548 A1 Mar. 8, 2018

(30) Foreign Application Priority Data
Mar. 18, 2015 (KR) .................. 10-2015-0037686

(51) Int. Cl.
*G06F 1/16* (2006.01)
*G06F 1/32* (2019.01)
*G08B 21/18* (2006.01)
*H04M 19/04* (2006.01)

(52) U.S. Cl.
CPC .............. *G08B 21/18* (2013.01); *G06F 1/16* (2013.01); *G06F 1/163* (2013.01); *G06F 1/32* (2013.01); *G08B 21/182* (2013.01); *H04M 19/04* (2013.01)

(58) Field of Classification Search
CPC ................................ G08B 21/18; G06F 1/163
USPC .......................... 340/539.1, 539.11, 539.13
See application file for complete search history.

(56) References Cited

U.S. PATENT DOCUMENTS

| 9,622,214 | B2 * | 4/2017 | Ryu .................. H04M 1/725 |
| 2002/0138775 | A1 | 9/2002 | Hammond et al. |
| 2004/0135696 | A1 | 7/2004 | Hasegawa |
| 2008/0133956 | A1 | 6/2008 | Fadell |
| 2009/0098889 | A1 | 4/2009 | Barcklay et al. |
| 2014/0228062 | A1 | 8/2014 | Rubowitz |

OTHER PUBLICATIONS

International Search Report for PCT/KR2016/002539 dated Jul. 19, 2016 from Korean Intellectual Property Office.

* cited by examiner

*Primary Examiner* — Daryl C Pope
(74) *Attorney, Agent, or Firm* — Revolution IP, PLLC

(57) ABSTRACT

Disclosed is a notification output method of a mobile device, including recognizing an occurrence of a notification event, identifying at least one wearable device communication-connected to the mobile device and capable of outputting a notification, checking a battery state of the mobile device and a battery state of the at least one wearable device, and outputting a notification using at least one of the mobile device and the at least one wearable device based on the battery states.

18 Claims, 15 Drawing Sheets

【Figure 1】
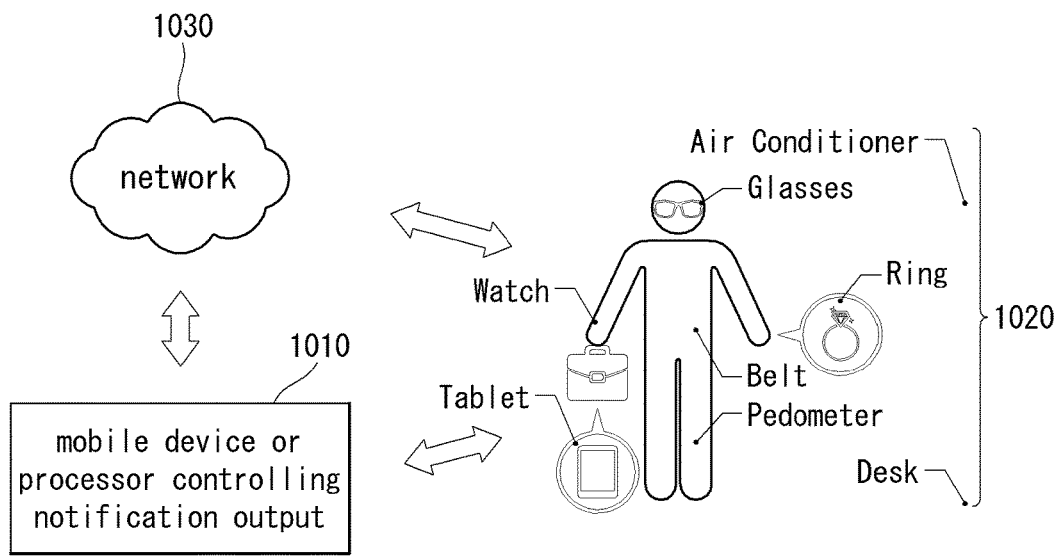
【Figure 2】
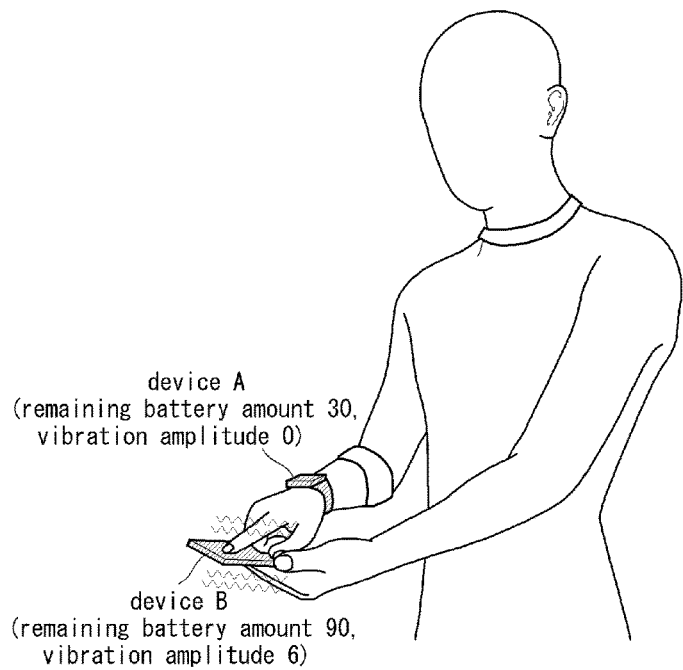

[Figure 3]
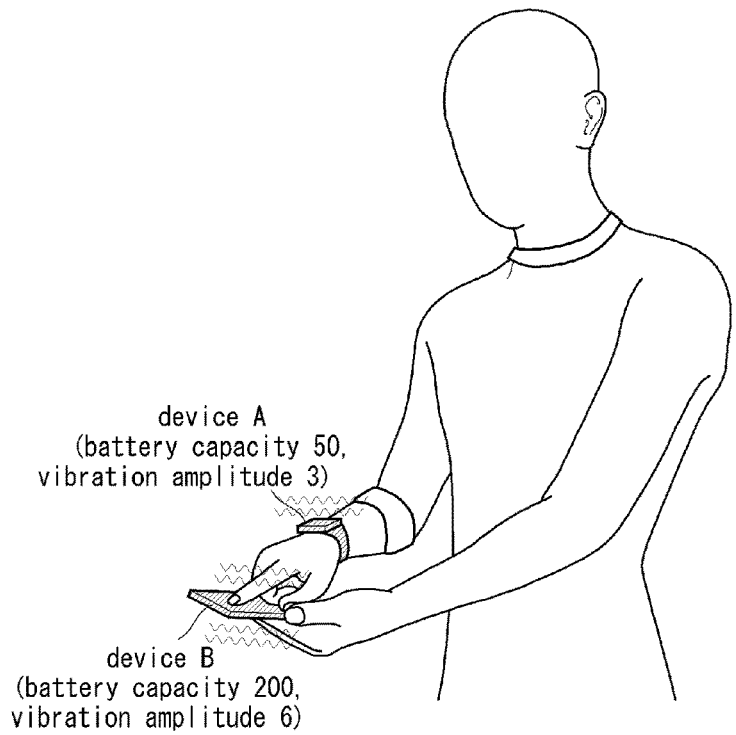
[Figure 4]
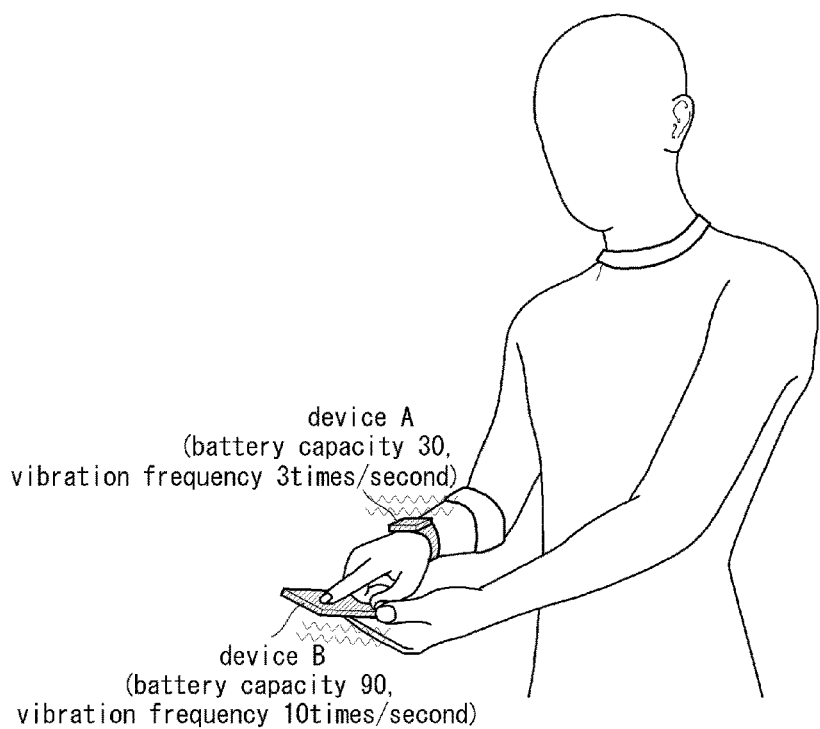

【Figure 5】
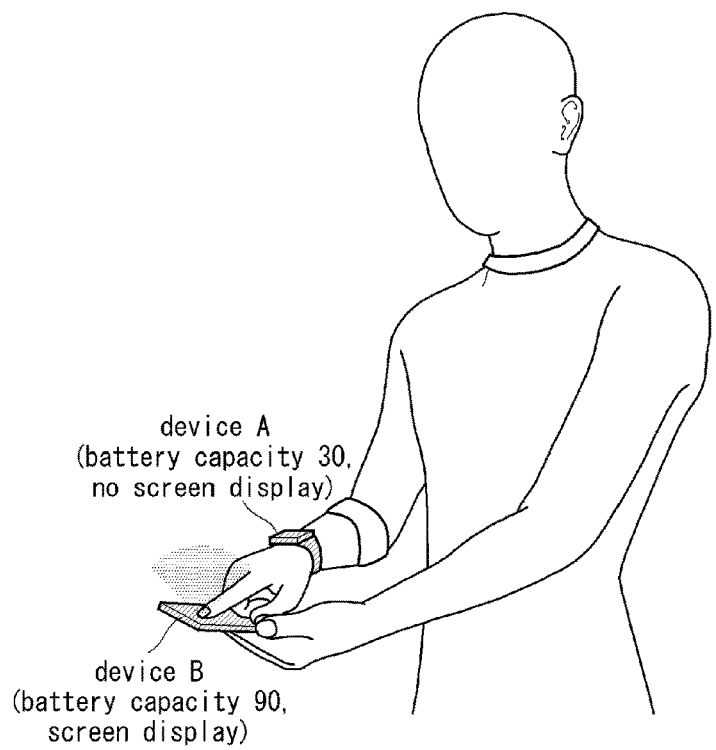
【Figure 6】
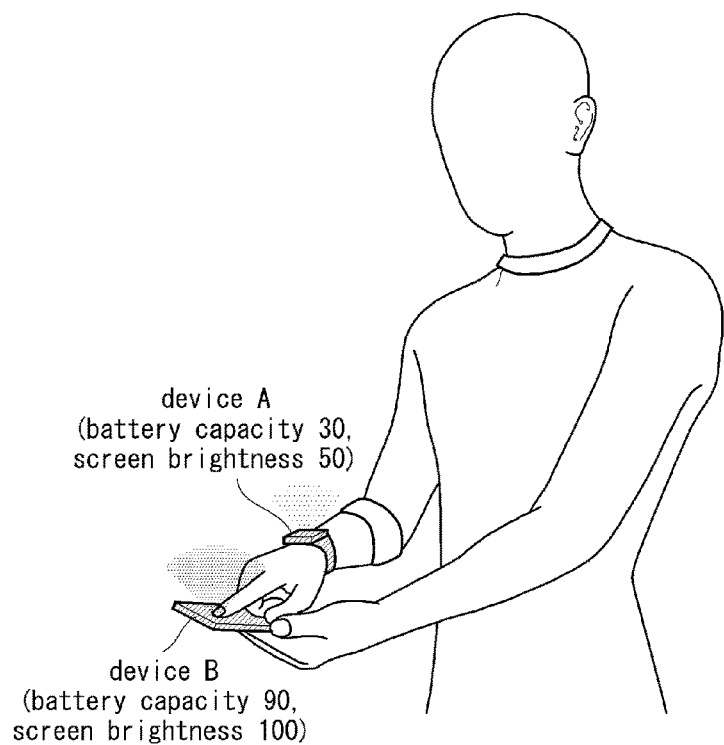

[Figure 7]
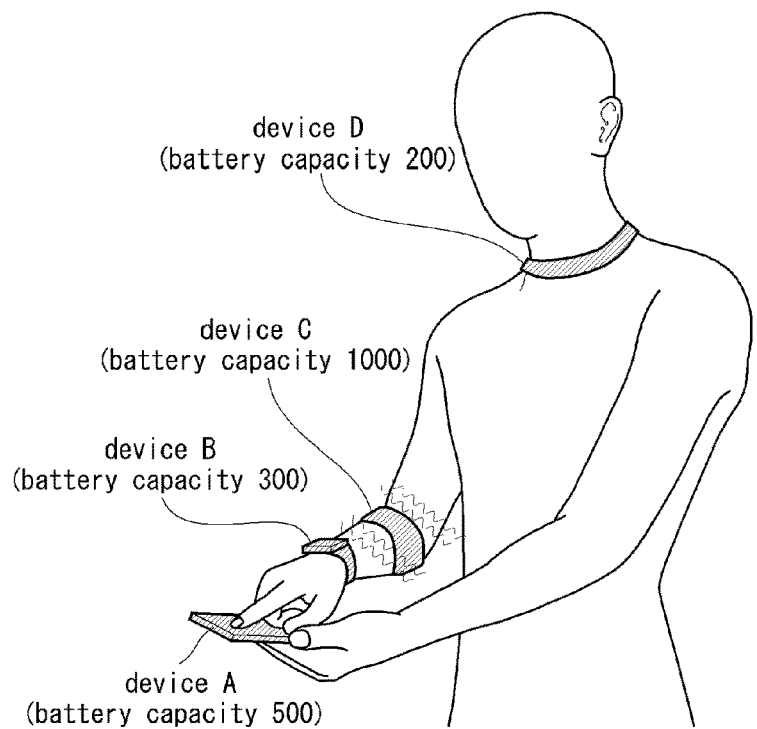
[Figure 8]
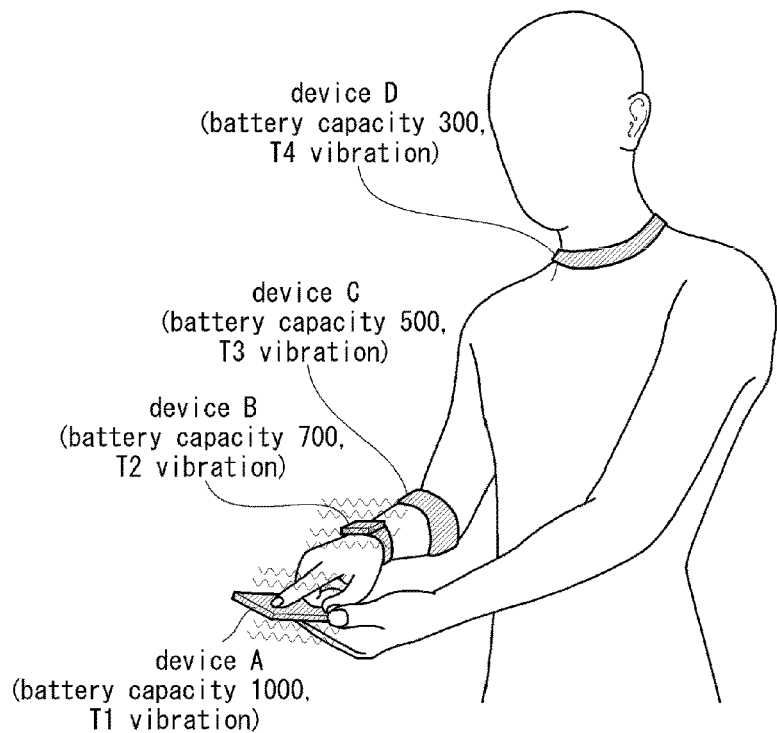

[Figure 9]
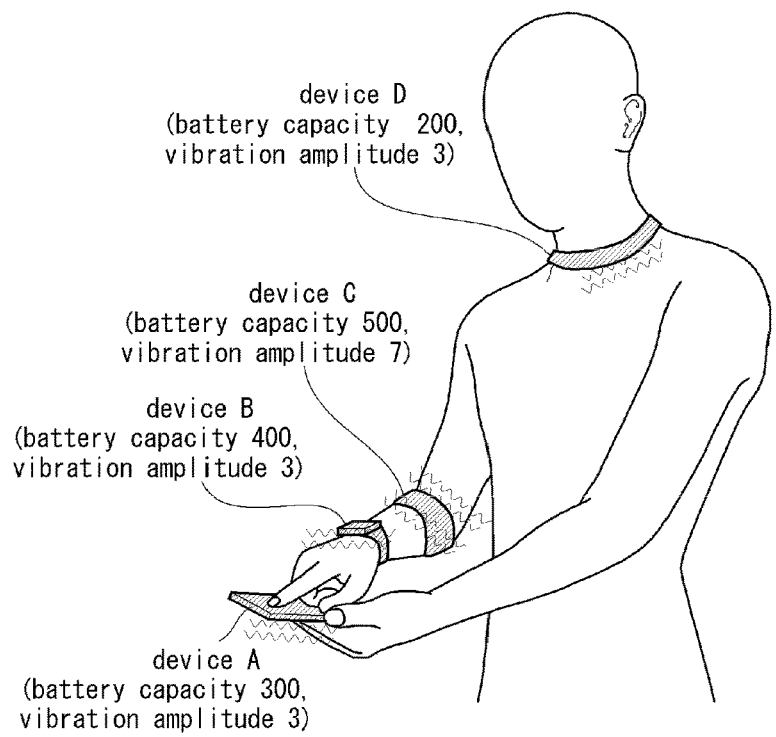
[Figure 10]
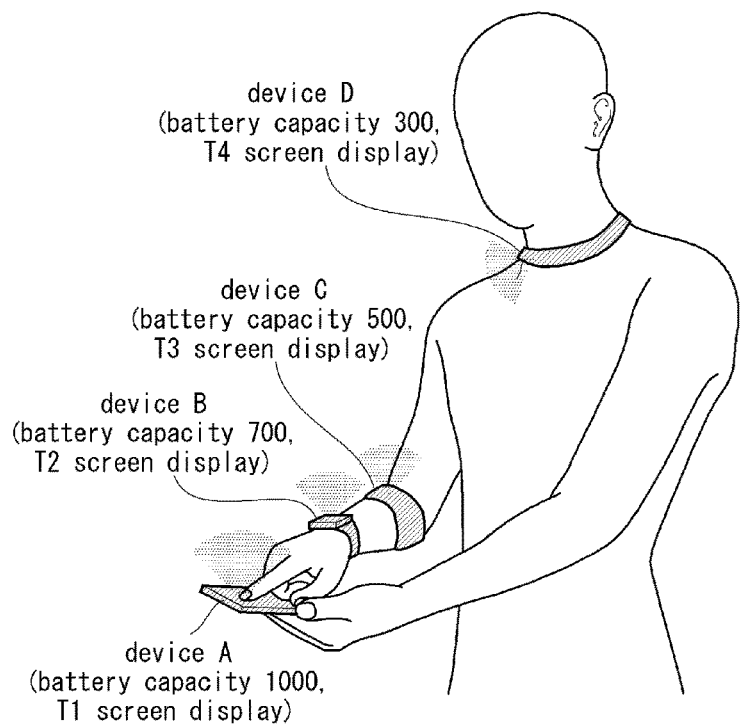

[Figure 11]
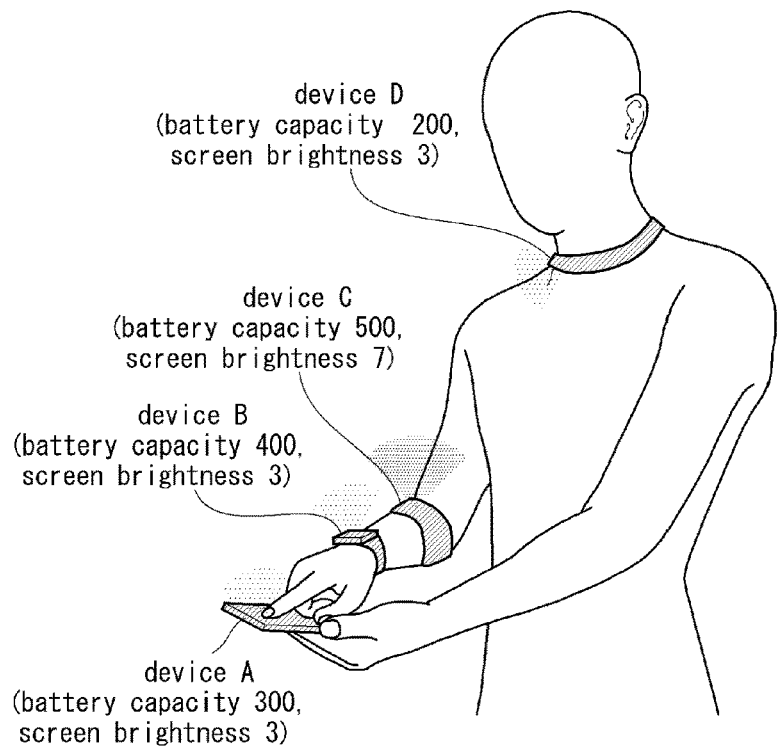
[Figure 12]
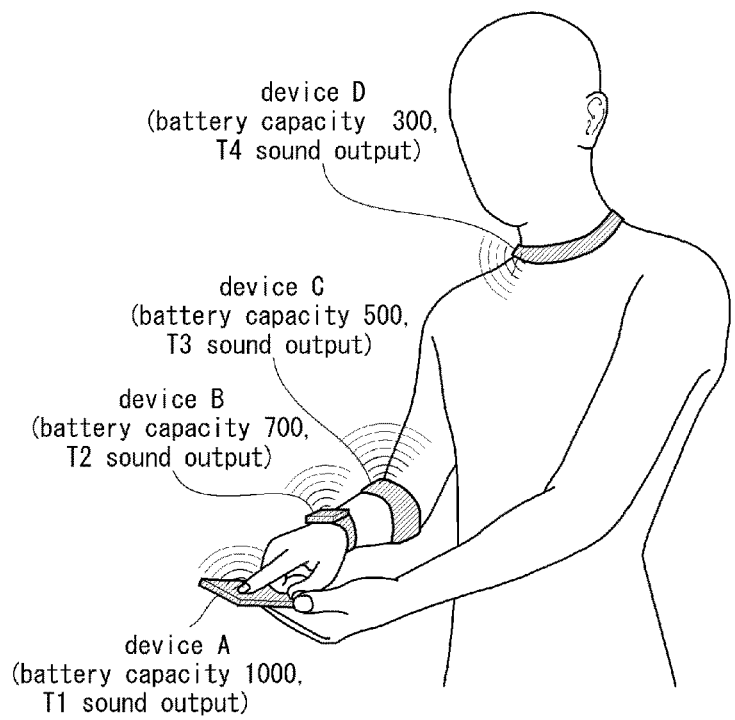

【Figure 13】
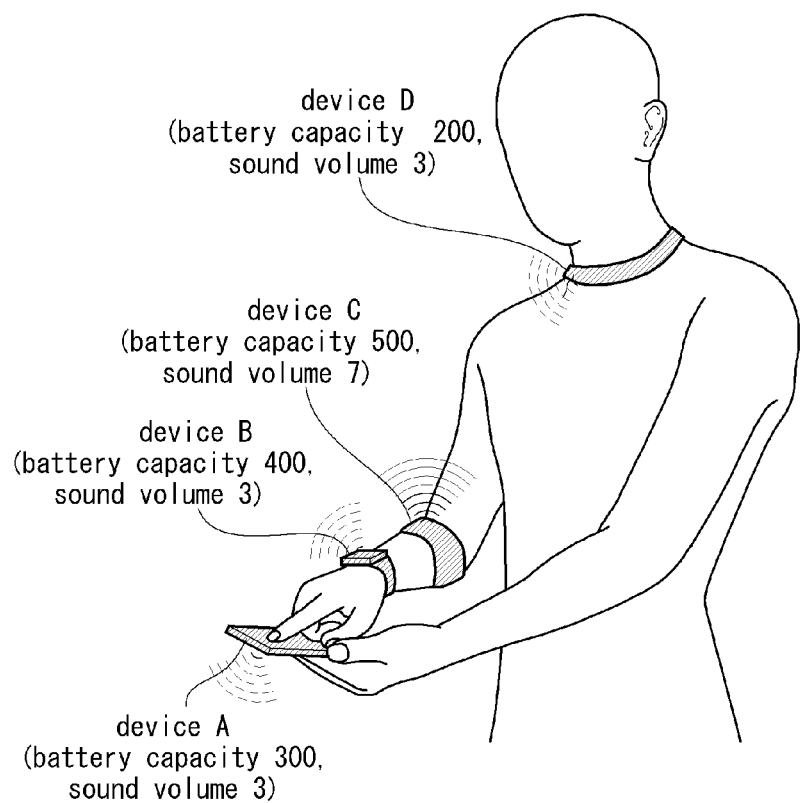

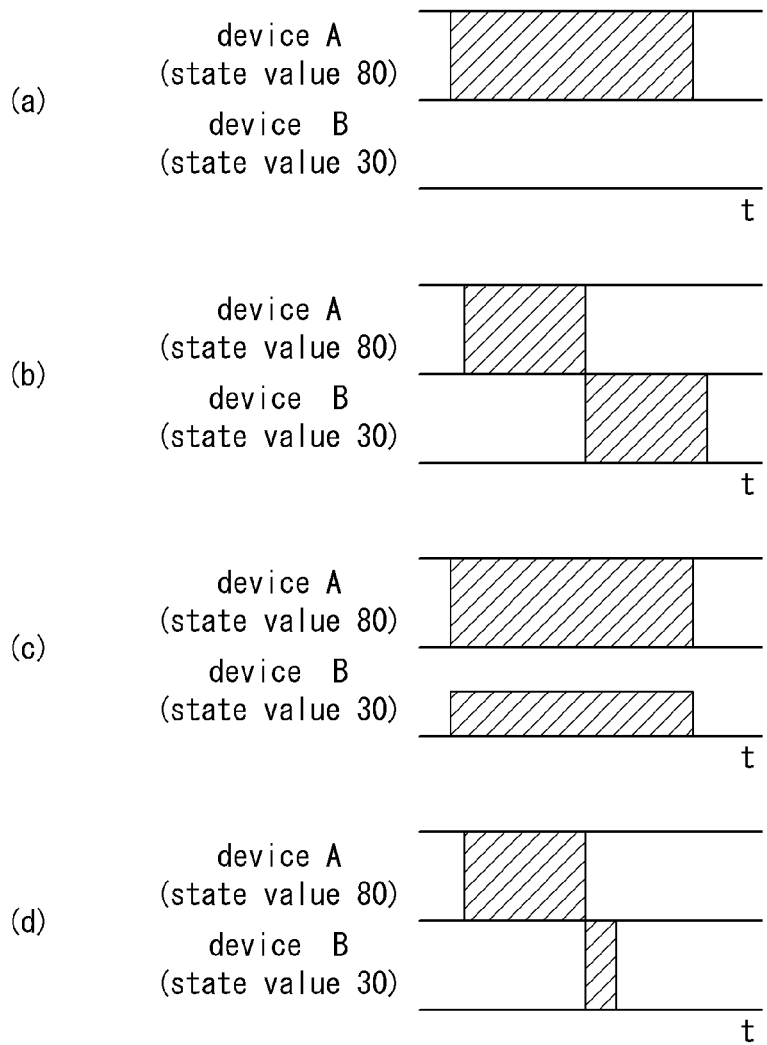

[Figure 15]
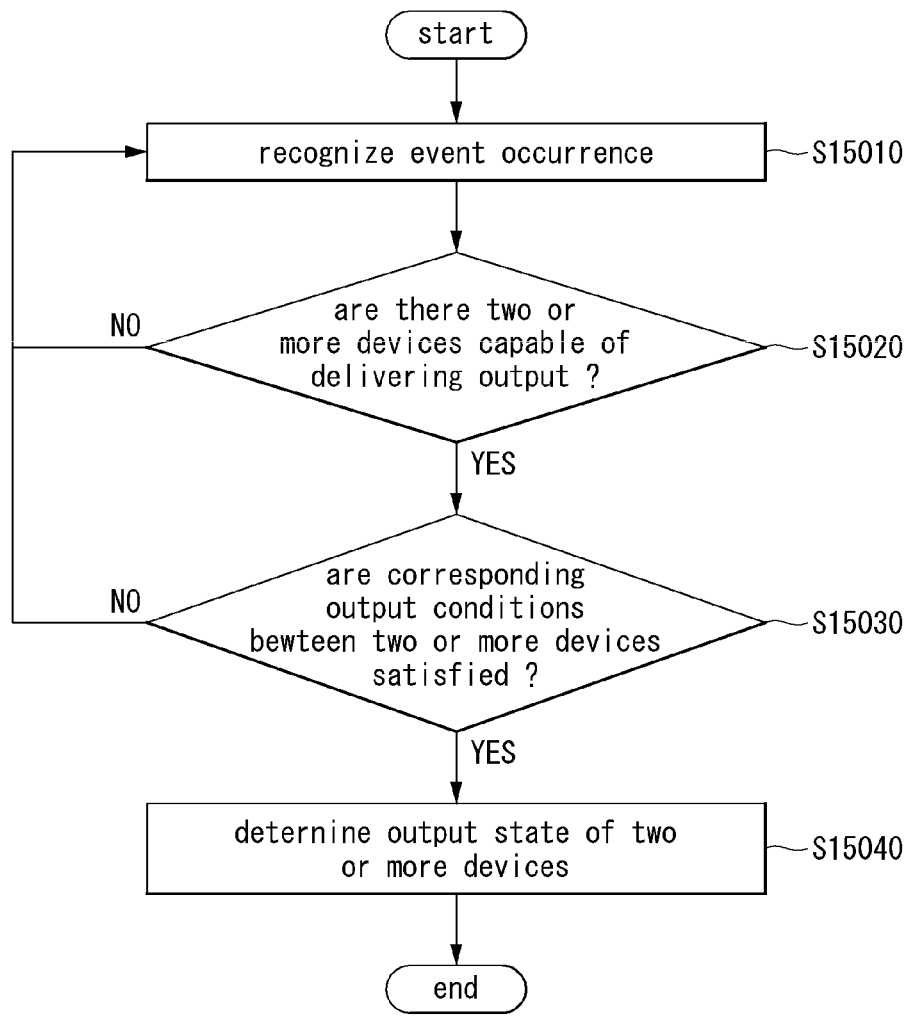

[Figure 16]
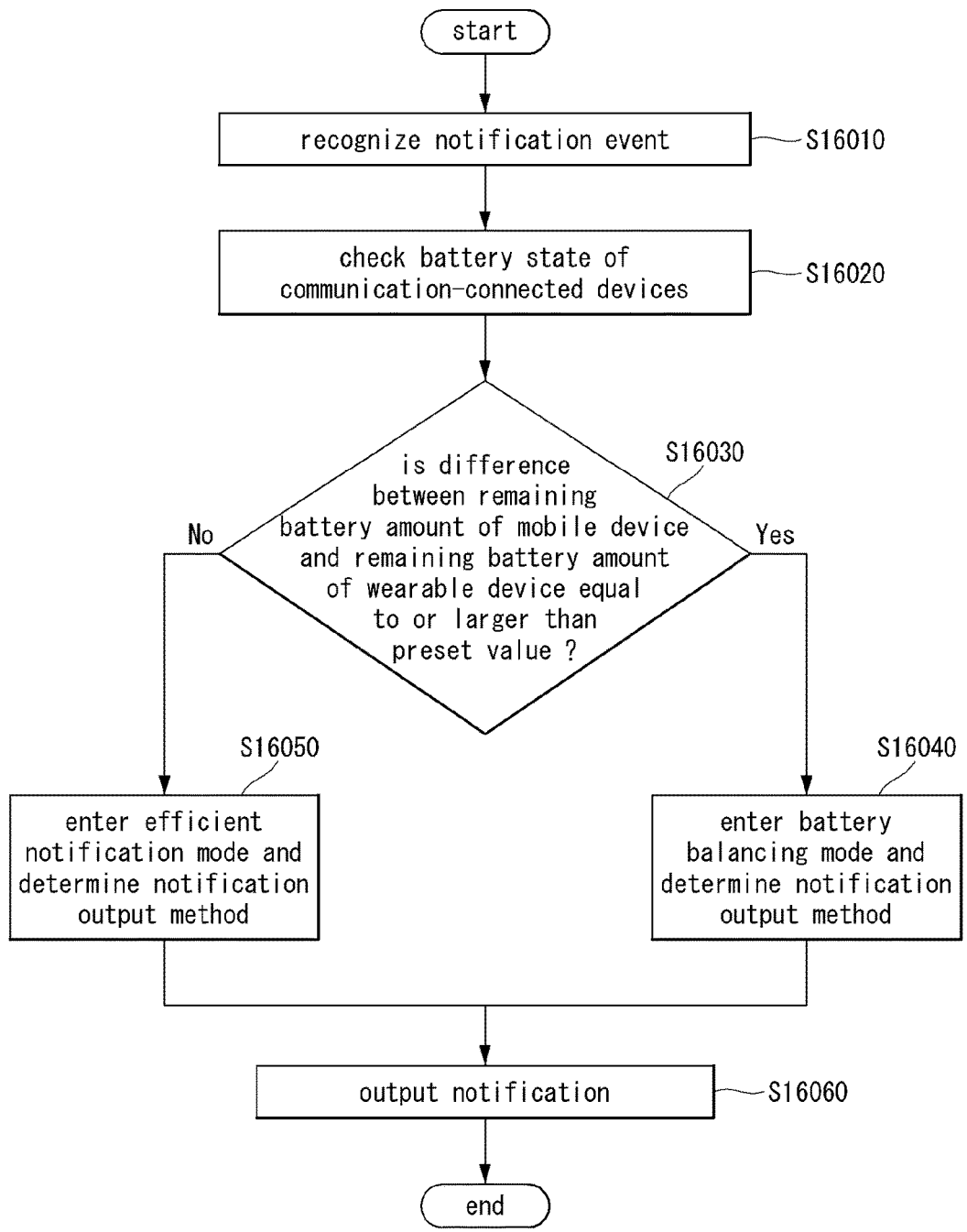

[Figure 17]
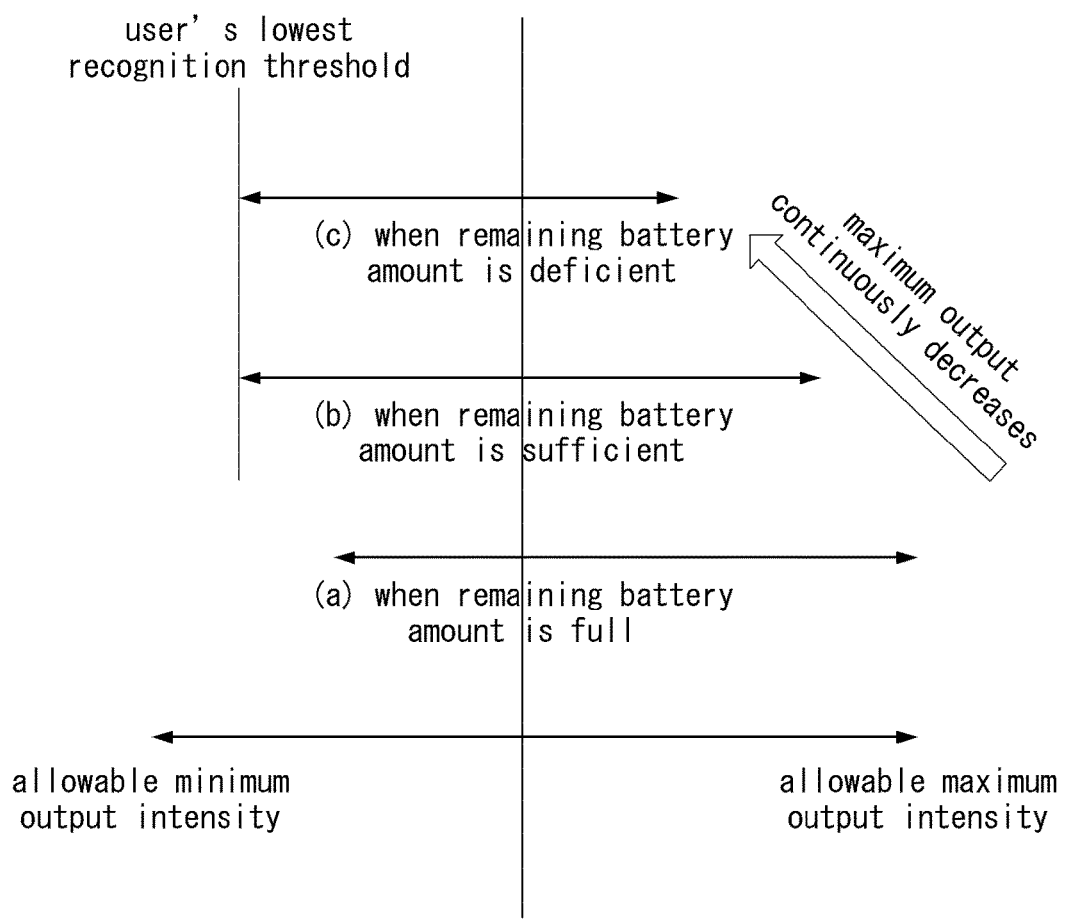

[Figure 18]
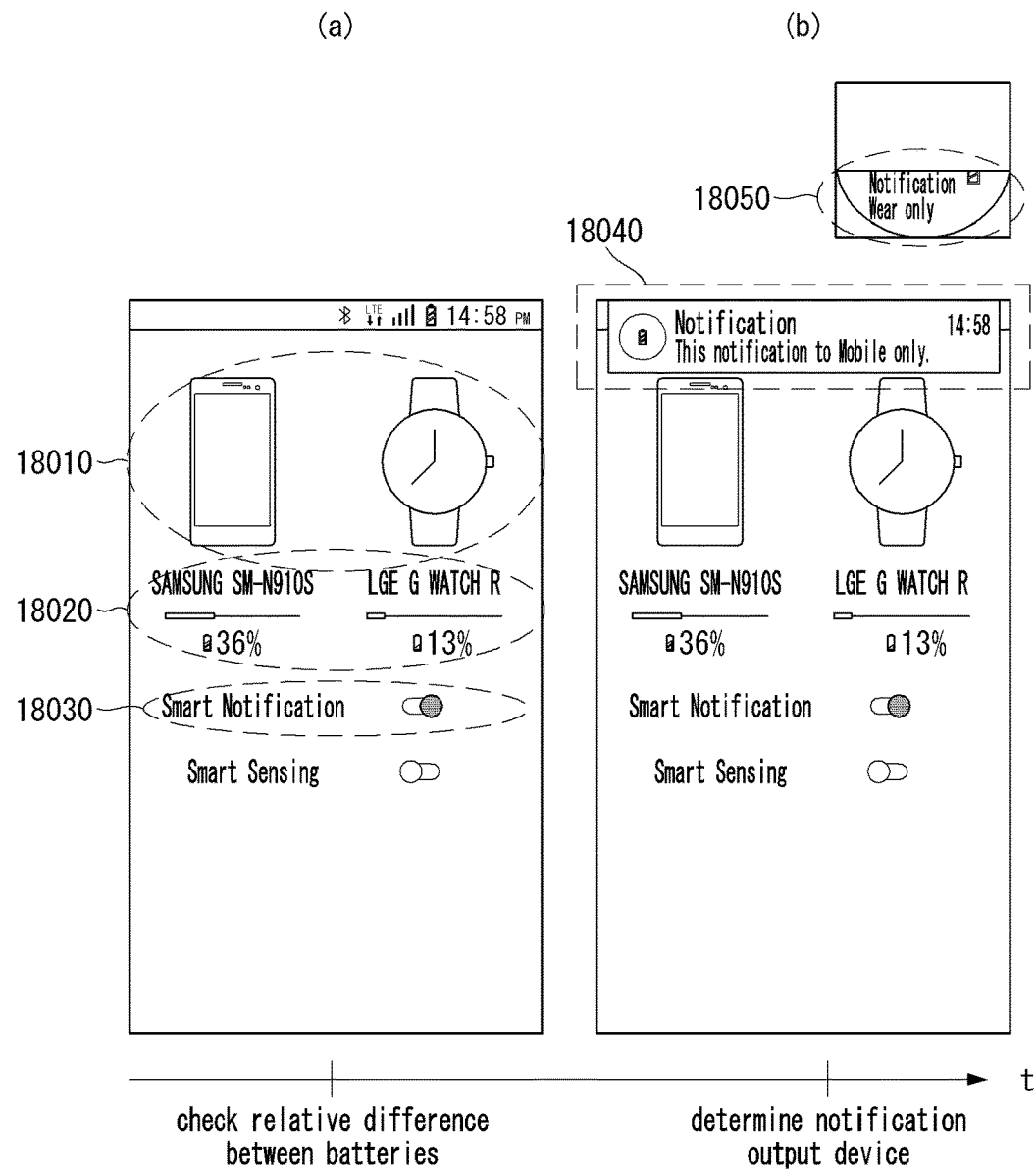

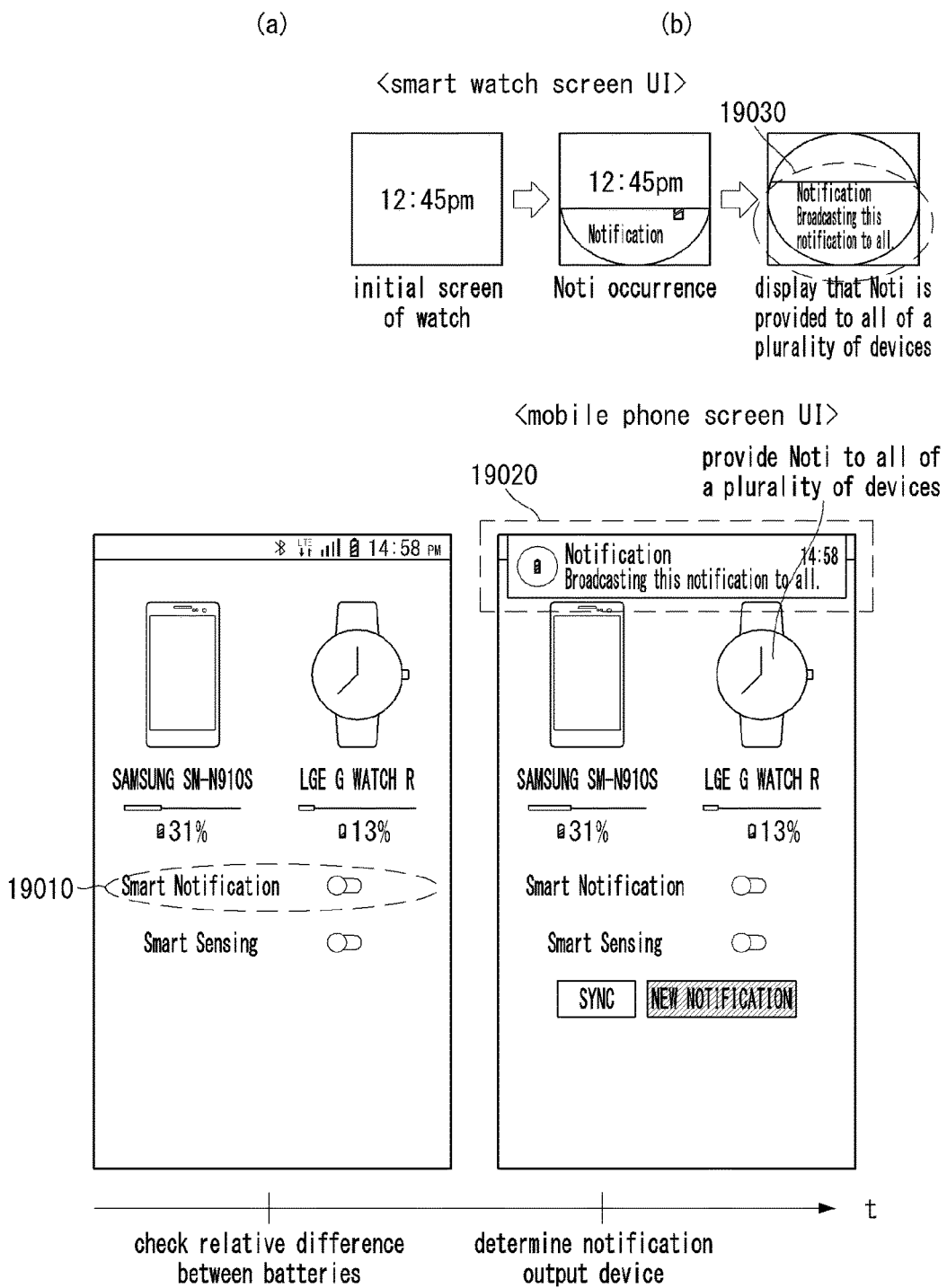

【Figure 20】
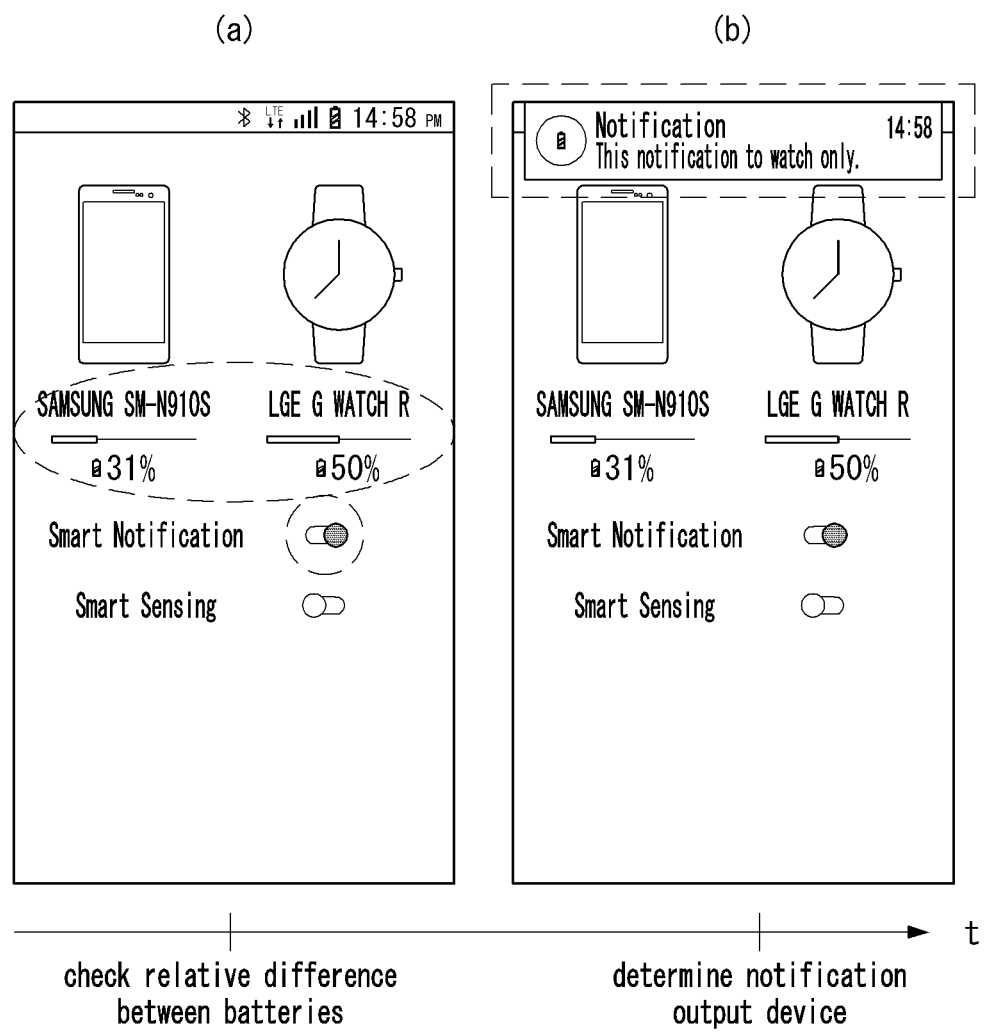

[Figure 21]
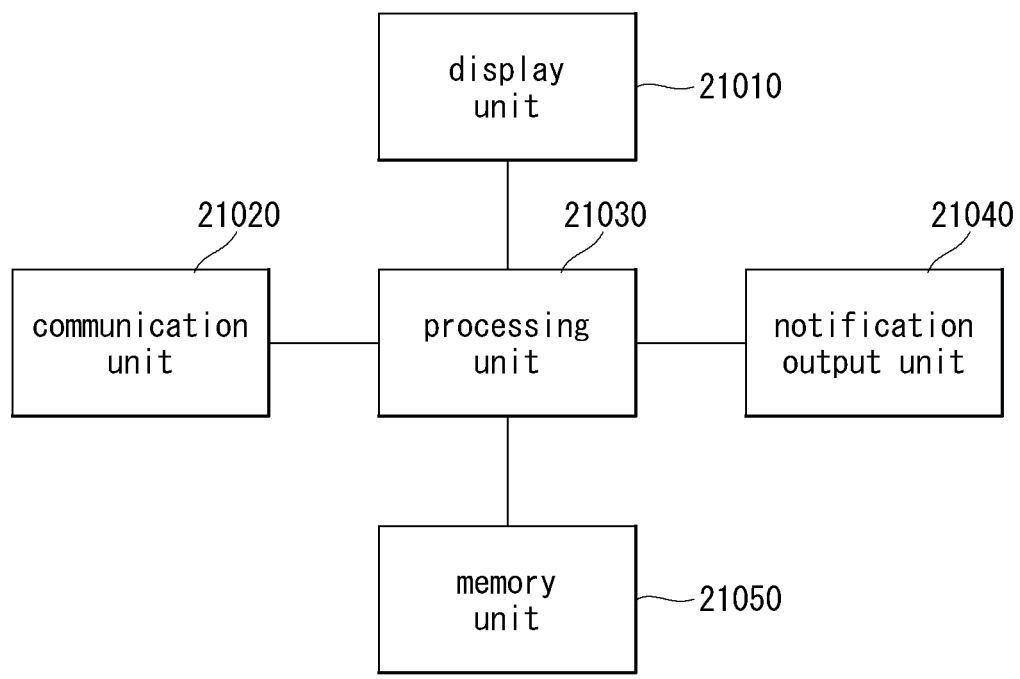

MOBILE DEVICE AND NOTIFICATION OUTPUT METHOD

CROSS REFERENCE TO PRIOR APPLICATIONS

This application is a National Stage Application of PCT International Patent Application No. PCT/KR2016/002539 filed on Mar. 15, 2016, under 35 U.S.C. § 371, which claims priority to Korean Patent Application No. 10-2015-0037686 filed on Mar. 18, 2015, which are all hereby incorporated by reference in their entirety.

TECHNICAL FIELD

The present invention relates to a mobile device and a notification output method of the mobile device and, more particularly, to a method of controlling units for informing a user of an event in accordance with the battery state of a plurality of interlocked devices.

BACKGROUND ART

Following the commercialization of small mobile devices such as laptops, smart phones and smart pads, wearable devices such as smart glasses, smart watches, smart rings, smart necklaces and smart bands are also being commercialized. In addition, miniaturized sensors and communication chips have become widespread, and thus the Internet of Things (IOT), in which various devices collect and communicate data, has arrived. However, the limited battery capacity of each electronic device is still limited, and particularly, battery management becomes an increasingly important issue as miniaturization and wear time of wearable devices increase.

DISCLOSURE

Technical Problem

As the various devices are interlocked, a plurality of devices may together or selectively provide an alarm to a user. The notification provided to a user differs in power consumption according to the outputting means. The amount of power consumption may vary according to the type of device and the type of alarm provided by the device. Accordingly, when a plurality of devices are interlocked, an efficient notification output control method is needed according to the battery state of the devices and the amount of the power consumption according to the notification output.

Technical Solution

For solving above mentioned technical problem, mobile device and notification output method thereof are provided.

According to an aspect of the present invention, there is provided a notification output method of a mobile device, the method including: recognizing an occurrence of a notification event; identifying at least one wearable device communication-connected to the mobile device and capable of outputting a notification; checking a battery state of the mobile device and a battery state of the at least one wearable device; and outputting a notification using at least one of the mobile device and the at least one wearable device based on the battery states.

The outputting of the notification may include outputting a notification to a device having a largest remaining battery amount.

The outputting of the notification may include setting an output order of a plurality of devices based on a remaining battery amount and outputting a notification according to the set order.

The outputting of the notification may include outputting a notification at different intensities by each of devices according to a remaining battery amount.

The method may include stopping the outputting of the notification when a user input corresponding to the outputting of the notification is received by the mobile device and the at least one wearable device.

The method may further include editing notification contents to be outputted when a remaining battery amount of the device that outputs the notification is less than a first threshold.

A notification output time may be shortened by using the edited notification contents.

The checking of the battery state may further include determining whether or not a difference between the remaining battery amount of the mobile device and the remaining battery amount of the at least one wearable device is equal to or greater than a second threshold.

The method may include entering a battery balancing mode and determining a notification output method when the difference between the remaining battery amounts is equal to or greater than the second threshold, and entering an efficient notification mode and determining a notification output method when the difference between the remaining battery amounts is less than the second threshold.

Here, the battery balancing mode may be a mode that preferentially considers extension of the usage time of the mobile device and the wearable device, and the efficient notification mode may be a mode that preferentially considers transmission efficiency of the notification to a user.

In the battery balancing mode, the notification may be outputted using the mobile device or the wearable device.

In the efficient notification mode, the notification may be outputted using at least one of the mobile device and the wearable device.

The method, upon the entering of the battery balancing mode, may include: determining whether the remaining battery amount of the wearable device is equal to or greater than a third threshold; and outputting a notification to a device having a larger remaining battery amount among the mobile device and the wearable device when the remaining battery amount of the wearable device is equal to or greater than the third threshold, and outputting a notification to the mobile device when the remaining battery amount of the wearable device is less than the third threshold.

The battery state may indicate at least one of battery capacity, remaining battery amount, charge frequency, power efficiency and battery sustainability time.

According to another aspect of the present invention, there is provided a mobile device including: a communication unit performing communication with at least one wearable device capable of outputting a notification; a notification output unit outputting a notification event; and a memory unit storing digital data, and controlling the communication unit, the notification output unit, and the memory unit to output a notification, wherein the mobile device: recognizes an occurrence of a notification event; identifies at least one wearable device communication-connected to the mobile device and capable of outputting a notification; checks a battery state of the mobile device and a battery state of the at least one wearable device; and outputs a notification using at least one of the mobile device and the at least one wearable device based on the battery states.

An output order of a plurality of devices may be set based on a remaining battery amount and a notification may be outputted according to the set order.

The outputting of the notification may be stopped when a user input corresponding to the outputting of the notification is received by the mobile device and the at least one wearable device.

Notification contents to be outputted may be edited when a remaining battery amount of the device that outputs the notification is less than a first threshold, and a notification output time may be shortened by using the edited notification contents.

The checking of the battery state may be performed by determining whether or not a difference between the remaining battery amount of the mobile device and the remaining battery amount of the at least one wearable device is equal to or greater than a second threshold.

The mobile device may enter a battery balancing mode and may determine a notification output method when the difference between the remaining battery amounts is equal to or greater than the second threshold, and may enter an efficient notification mode and may determine a notification output method when the difference between the remaining battery amounts is less than the second threshold. Here, the battery balancing mode may be a mode that preferentially considers extension of the usage time of the mobile device and the wearable device, and the efficient notification mode may be a mode that preferentially considers transmission efficiency of the notification to a user.

In the battery balancing mode, the notification may be outputted using the mobile device or the wearable device, and in the efficient notification mode, the notification may be outputted using at least one of the mobile device and the wearable device.

The mobile device, upon the entering of the battery balancing mode, may determine whether the remaining battery amount of the wearable device is equal to or greater than a third threshold; and may output a notification to a device having a larger remaining battery amount among the mobile device and the wearable device when the remaining battery amount of the wearable device is equal to or greater than the third threshold, and may output a notification to the mobile device when the remaining battery amount of the wearable device is less than the third threshold.

The battery state may indicate at least one of battery capacity, remaining battery amount, charge frequency, power efficiency and battery sustainability time.

Advantageous Effects

According to the embodiments, it is possible to efficiently use the battery and thereby extend the use time of the devices by appropriately distributing the notification output among a plurality of communication-connected devices based on the battery state. Also, the notification delivery efficiency to a user can be improved.

The present invention can provide more intelligent battery and notification by outputting a notification in two modes in accordance with a difference of remaining battery amounts, rather than by simply comparing the remaining battery amounts. The present invention can satisfy both the battery management and notification delivery efficiency, by providing the battery balancing mode considering the operation time of the devices according to the battery difference and the efficient notification mode preferentially considering the transmission efficiency of a notification.

DESCRIPTION OF DRAWINGS

The accompanying drawings, which are included to provide a further understanding of the present invention and are incorporated in and constitute a part of the present application, illustrate embodiments of the invention together with the detailed description explaining the principles of the present invention.

FIG. 1 is a view illustrating a notification control system according to an embodiment of the present invention.

FIG. 2 is a view illustrating a notification output method of a plurality of devices according to an embodiment of the present invention.

FIG. 3 is a view illustrating a notification output method of a plurality of devices according to another embodiment of the present invention.

FIG. 4 is a view illustrating a notification output method of a plurality of devices according to another embodiment of the present invention.

FIG. 5 is a view illustrating a notification output method of a plurality of devices according to another embodiment of the present invention.

FIG. 6 is a view illustrating a notification output method of a plurality of devices according to another embodiment of the present invention.

FIG. 7 is a view illustrating a notification output method of a plurality of devices according to another embodiment of the present invention.

FIG. 8 is a view illustrating a notification output method of a plurality of devices according to another embodiment of the present invention.

FIG. 9 is a view illustrating a notification output method of a plurality of devices according to another embodiment of the present invention.

FIG. 10 is a view illustrating a notification output method of a plurality of devices according to another embodiment of the present invention.

FIG. 11 is a view illustrating a notification output method of a plurality of devices according to another embodiment of the present invention.

FIG. 12 is a view illustrating a notification output method of a plurality of devices according to another embodiment of the present invention.

FIG. 13 is a view illustrating a notification output method of a plurality of devices according to another embodiment of the present invention.

FIG. 14 is a graph illustrating a notification output control of a plurality of devices according to an embodiment of the present invention.

FIG. 15 is a flowchart illustrating a notification output method of a plurality of devices according to an embodiment of the present invention.

FIG. 16 is a flowchart illustrating a notification output method of a mobile device according to an embodiment of the present invention.

FIG. 17 is a view illustrating a method of controlling the notification output intensity of a control device according to an embodiment of the present invention.

FIG. 18 is a view illustrating a Graphic User Interface (GUI) of a control device performing a notification output method according to an embodiment of the present invention.

FIG. 19 is a view illustrating a GUI of a control device performing a notification output method according to an embodiment of the present invention.

FIG. 20 is a view illustrating a Graphic User Interface (GUI) of a control device performing a notification output method according to an embodiment of the present invention.

FIG. 21 is a view illustrating a configuration of a control device according to an embodiment of the present invention.

BEST MODES

Preferred embodiments of the present invention will be described in detail with reference to the accompanying drawings. The following detailed description with reference to the accompanying drawings is to illustrate preferred embodiments of the present invention rather than illustrate only embodiments that can be implemented according to embodiments of the present invention. The following detailed description includes details in order to provide the understanding of the present invention.

Most of the terms used in this disclosure are selected from common ones widely used in the corresponding field, but some terms are arbitrarily selected by the applicant and the meaning thereof will be described in detail in the following description as necessary. Therefore, the present invention should be understood based on the intended meanings of the terms rather than the simple names or meanings of the terms.

In an embodiment, a mobile device is used as a portable electronic device, including a variety of wearable devices worn by a user, as well as electronic devices such as a notebook, a tablet PC, a smart phone, a phablet, and a smart tumbler. A wearable device refers to various electronic devices that may be worn by users such as smart glasses, smart watches, smart rings, and smart bracelets. Although a mobile device is described as an example in embodiments, the operation of the present invention is not necessarily limited to the mobile device, and various electronic devices capable of performing embodiments of the present invention may be included in the scope of the present invention. However, the mobile device and the wearable device referred to in the claims of the present disclosure are not limited by the above-described embodiments. In an embodiment, the mobile device or wearable device may correspond to a communicatable electronic device such as a smart car, a smart home server, or a smart apparel.

Hereinafter, the present invention will be described based on a device that performs a method of the present invention. However, the present invention may be implemented and executed by an application or software. In this case, the device is a device that drives an application or software for implementing/performing the present invention, and the device executes the present invention according to the driving of the application or software. Accordingly, although the description of the present invention will be described below with reference to a device, the description of the present invention should also be considered as an explanation of the application/software implementing the present invention. The following description of the specification and method of the claims should be considered as describing the operation of an application/software according to an embodiment of the present invention. Accordingly, the following description of the present invention is also applied to software/applications coded to perform the method of the present invention separately from the device. The operations of the device described below can all be understood as the operations of the software/application.

FIG. 1 is a view illustrating a notification control system according to an embodiment of the present invention.

In FIG. 1, the notification control system includes a mobile device 1010, various electronic devices 1020 that communicate with the mobile device 1010, and a network 1030 that is a communication medium between the mobile device 1010 and the external electronic devices 1020. FIG. 1 illustrates a schematic configuration of a method and system capable of reducing repeated output resources by adjusting the output strength, order, shape, and operation of a device when a Noti output of two or more devices spaced from each other can be delivered to a user.

The mobile device 1010 may include at least one notification providing unit and a processing unit, and may communicate with various external electronic devices 1020, which are communicatively connected, to output a notification. The notification control of the mobile device 1010 may be performed by an application, which may be stored in a memory and be driven by a processor. The processor may also be referred to as a processing unit. The communicatively-connected external devices may also be referred to as paired or linked external devices.

The external electronic devices 1020 may include various electronic devices that include at least one notification providing unit and can communicate with the mobile device 1010 via the network 1030. For example, as shown in FIG. 1, the external electronic devices 1020 may include a smart watch, a tablet PC, an air conditioner, glasses, a smart ring, a belt, a pedometer, a smart desk, and the like. These external electronic devices 1020 may include at least one notification providing unit, and may be controlled to output a notification together with or independently of other mobile devices 1020.

The network 1030 represents a variety of communication networks capable of transmitting and receiving electronic data wiredly or wirelessly. For example, the network 1030 represents communication systems using various communication protocols such as Internet, Local Area Network (LAN), Wireless Local Area Network (WLAN), Wide Area Network (WAN), Wireless Fidelity (WiFi), Long Term Evolution (LTE), Bluetooth, 3G, 4G, NFC, and Zigbee, or a combination thereof, and is not limited to the above-described embodiments.

Hereinafter, it will be assumed that the mobile device is connected to the external device through a network. Hereinafter, the device 1010 that controls the notification output according to the battery state or the like may be referred to as a control device among a plurality of mobile devices. The control device may correspond to the devices that output the notification using the notification output unit, or may also correspond to a separate device that is network-connected with such devices and controls the devices. The control device may control the notification outputs of the control device and at least one external device. The control device and the external devices include at least one notification output unit, respectively.

In the system, the control device 1010 that controls notification output may also be referred to as an output determining unit. The output determining unit 1010 may adaptively output a notification according to the states (e.g., battery capacity, remaining battery amount, charge frequency, power consumption efficiency, battery sustainable time, contact state, distance between devices, sensor value, etc.) of the device and the battery when the notification outputted from two or more devices can be delivered to a user (e.g., when the device can deliver a notification to a part of a user's body or is located at a close distance). The output determining unit 1010 may reduce the repeated output resources by controlling the notification output method (visual, auditory, and tactile senses) or selecting the notification output device. The output determining unit, which is a concept including a computer-readable recording medium, may be a database in a broad sense of the word including data records based on a file system as well as a database in a narrow sense of the word.

For example, a display providing a visual notification, a speaker providing an auditory/sound notification, a vibration unit providing a tactile notification and the like may correspond to the notification output unit.

The control device may control the usage ratio of the notification output unit of the control device and the notification output unit of the external devices. Only one notification output unit may be selectively used according to the usage ratio controlled by the control device. The usage method of the notification output units, the amount of power according to the use of the notification output unit, and the like may be controlled according to the usage ratio.

The priorities of the notification output units may also be changed according to the characteristics of a user or an application that is being executed. For example, even when the battery state (battery capacity, battery remaining amount, charge frequency, power efficiency, battery sustainable time, etc.) of a second device is better than that of a first device, by further prioritizing the efficiency such as the notification output time and the output accuracy, the first device may be determined as a notification output device. That is, the present invention may control the notification output by prioritizing one of the two conditions of the state of the battery and the notification efficiency according to the context. For example, when it is necessary to output a specific notification within the shortest time, the control device may output a notification by selecting an output unit capable of quickly operating from the notification output units of connected devices, or may output a notification by combining a plurality of notification output units of a plurality of devices. Even though the plurality of notification output units of the plurality of devices output the same kind of feedback, specific specifications and conditions may be different. Accordingly, the utilization of the output unit may vary according to the processing performance of the device and the presence/absence of a sensor hub, Hereinafter, embodiments of a method of outputting notifications by a plurality of devices will be described.

FIG. 2 is a view illustrating a notification output method of a plurality of devices according to an embodiment of the present invention.

In FIG. 2, a device A represents a wearable device such as a smart watch, and a device B represents a mobile device such as a smart phone. As shown in FIG. 2, when a user holds/wears the device A and the device B, the devices may output a vibration notification in accordance with the battery condition. That is, when the wearable device and the mobile device are within a certain distance and thus both devices can transmit information to a user, the control device may control the notification output of the devices.

As shown in FIG. 2, when the battery remaining amount of the device A is 30 and the battery remaining amount of the device B is 90, the control device may output a vibration notification with the vibration amplitude of 6 only to the device B having a larger battery remaining amount. The control device may not output a vibration notification to the device A (vibration amplitude 0), thereby reducing power consumption while preventing duplicate notification.

FIG. 3 is a view illustrating a notification output method of a plurality of devices according to another embodiment of the present invention.

In FIG. 3, a device A represents a wearable device such as a smart watch, and a device B represents a mobile device such as a smart phone. As shown in FIG. 3, when a user holds/wears the device A and the device B, the devices may output a vibration notification in accordance with the battery condition. That is, when the wearable device and the mobile device are within a certain distance and thus both devices can transmit information to a user, the control device may control the notification output of the devices.

As shown in FIG. 3, when the battery capacity of the device A is 50 and the battery capacity of the device B is 200, the control device may together or sequentially output the vibration notifications by allowing the vibration amplitude of the device A to be 3 and allowing the vibration intensity of the device B to be 6. The control device may reduce battery consumption by reducing the vibration amplitude of the wearable device having a smaller battery remaining amount by half.

FIG. 4 is a view illustrating a notification output method of a plurality of devices according to another embodiment of the present invention.

In FIG. 4, a device A represents a wearable device such as a smart watch, and a device B represents a mobile device such as a smart phone. As shown in FIG. 4, when a user holds/wears the device A and the device B, the devices may output a vibration notification in accordance with the battery condition. That is, when the wearable device and the mobile device are within a certain distance and thus both devices can transmit information to a user, the control device may control the notification output of the devices.

As shown in FIG. 4, when the battery capacity of the device A is 30 and the battery capacity of the device B is 90, the control device may output the vibration notifications by allowing the vibration frequency of the device A to be 3 times/second and allowing the vibration frequency of the device B to be 10 times/second. The control device may minimize battery consumption by reducing the vibration frequency of the wearable device having a smaller battery remaining amount.

FIG. 5 is a view illustrating a notification output method of a plurality of devices according to another embodiment of the present invention.

In FIG. 5, a device A represents a wearable device such as a smart watch, and a device B represents a mobile device such as a smart phone. As shown in FIG. 5, when a user holds/wears the device A and the device B, the devices may output a vibration notification in accordance with the battery condition. That is, when the wearable device and the mobile device are within a certain distance and thus both devices can transmit information to a user, the control device may control the notification output of the devices.

As shown in FIG. 5, when the battery capacity of the device A is 30 and the battery capacity of the device B is 90, the control device may output a visual notification only to the device A. The control device can reduce repeated energy consumption by outputting the visual notification only to the mobile device having a larger battery remaining amount among the interworking devices.

FIG. 6 is a view illustrating a notification output method of a plurality of devices according to another embodiment of the present invention.

In FIG. 6, a device A represents a wearable device such as a smart watch, and a device B represents a mobile device such as a smart phone. As shown in FIG. 6, when a user holds/wears the device A and the device B, the devices may output a vibration notification in accordance with the battery condition. That is, when the wearable device and the mobile device are within a certain distance and thus both devices can transmit information to a user, the control device may control the notification output of the devices.

As shown in FIG. 6, the control device may control the intensity of the visual notification output according to the battery state of the devices. In an embodiment, the control device may output visual notifications of each device by setting the screen brightness of the device B having a remaining battery capacity of 90 to 100 and setting the screen brightness of the device A having a remaining battery capacity of 30 to 50. Accordingly, it is possible to increase the usage time of a device having a low battery remaining amount and to reduce wasted energy.

FIG. 7 is a view illustrating a notification output method of a plurality of devices according to another embodiment of the present invention.

In FIG. 7, a device A represents a mobile device such as a smart phone, and a device B represents a wearable device such as a smart watch. Also, a device C represents a wearable device such as arm band/wrist band, and a device D represents a wearable device such as a smart necklace. As shown in FIG. 7, when a user holds/wears the device A, the device B, the device C, and the device D, the devices may output a vibration notification based on the battery condition. That is, when the wearable device and the mobile device are within a certain distance and thus both devices can transmit information to a user, the control device may control the notification output of the devices.

As shown in FIG. 7, when the battery capacity of the device A is 500, the battery capacity of the device B is 300, the battery capacity of the device C is 1000, and the battery capacity of the device D is 200, the control device may output the vibration notification only to the device C having the largest remaining battery capacity.

FIG. 8 is a view illustrating a notification output method of a plurality of devices according to another embodiment of the present invention.

In FIG. 8, a device A represents a mobile device such as a smart phone, and a device B represents a wearable device such as a smart watch. Also, a device C represents a wearable device such as arm band/wrist band, and a device D represents a wearable device such as a smart necklace. As shown in FIG. 8, when a user holds/wears the device A, the device B, the device C, and the device D, the devices may output a vibration notification in accordance with the battery condition. That is, when the wearable device and the mobile device are within a certain distance and thus both devices can transmit information to a user, the control device may control the notification output of the devices.

As shown in FIG. 8, when the battery capacity of the device A is 1000, the battery capacity of the device B is 700, the battery capacity of the device C is 500, and the battery capacity of the device D is 300, the control device may sequentially output the vibration notification from a device having the largest remaining battery capacity to a device having the smallest remaining battery capacity. For example, in FIG. 7, the device A may output a vibration notification at the time T1 to T2, and the device B may output a vibration notification at the time T2 to T3. Also, the device C may output a vibration notification at the time T3 to T4, and the device D may output a vibration notification after the time T4. However, when the vibration notification is confirmed by a user, the vibration notification can be stopped. For example, when the device B receives a user input such as a touch input while the device B is providing vibration notifications, the device C and the device D may not provide vibration notifications.

FIG. 9 is a view illustrating a notification output method of a plurality of devices according to another embodiment of the present invention.

In FIG. 9, a device A represents a mobile device such as a smart phone, and a device B represents a wearable device such as a smart watch. Also, a device C represents a wearable device such as arm band/wrist band, and a device D represents a wearable device such as a smart necklace. As shown in FIG. 9, when a user holds/wears the device A, the device B, the device C, and the device D, the devices may output a vibration notification in accordance with the battery condition. That is, when the wearable device and the mobile device are within a certain distance and thus both devices can transmit information to a user, the control device may control the notification output of the devices.

As shown in FIG. 9, when the battery capacity of the device A is 300, the battery capacity of the device B is 400, the battery capacity of the device C is 500, and the battery capacity of the device D is 200, the control device may differently set the vibration amplitude in accordance with the remaining battery capacity. For example, the vibration notification may be provided by setting the vibration amplitude of the device C having the largest remaining battery capacity to 7 and setting the vibration amplitude of the other devices to 3. Since the same purpose can be achieved using a device having a large battery capacity, the battery consumption of a device having a low battery capacity can be reduced and thus the use time of the devices can be increased.

FIG. 10 is a view illustrating a notification output method of a plurality of devices according to another embodiment of the present invention.

In FIG. 10, a device A represents a mobile device such as a smart phone, and a device B represents a wearable device such as a smart watch. Also, a device C represents a wearable device such as arm band/wrist band, and a device D represents a wearable device such as a smart necklace. As shown in FIG. 9, when a user holds/wears the device A, the device B, the device C, and the device D, the devices may output a vibration notification in accordance with the battery condition. That is, when the wearable device and the mobile device are within a certain distance and thus both devices can transmit information to a user, the control device may control the notification output of the devices.

As shown in FIG. 10, when the battery capacity of the device A is 1000, the battery capacity of the device B is 700, the battery capacity of the device C is 500, and the battery capacity of the device D is 300, the control device may sequentially output the visual notification from a device having the largest remaining battery capacity to a device having the smallest remaining battery capacity. For example, in FIG. 7, the device A may output a visual notification at the time T1 to T2, and the device B may output a visual notification at the time T2 to T3. Also, the device C may output a visual notification at the time T3 to T4, and the device D may output a visual notification after the time T4. However, when the visual notification is confirmed by a user, the visual notification can be stopped. For example, when the device B receives a user input such as a touch input while the device B is providing a visual notification, the device C and the device D may not provide visual notifications.

FIG. 11 is a view illustrating a notification output method of a plurality of devices according to another embodiment of the present invention.

In FIG. 11, a device A represents a mobile device such as a smart phone, and a device B represents a wearable device such as a smart watch. Also, a device C represents a wearable device such as arm band/wrist band, and a device D represents a wearable device such as a smart necklace. As shown in FIG. 11, when a user holds/wears the device A, the device B, the device C, and the device D, the devices may output a vibration notification in accordance with the battery condition. That is, when the wearable device and the mobile device are within a certain distance and thus both devices can transmit information to a user, the control device may control the notification output of the devices.

As shown in FIG. 11, when the battery capacity of the device A is 300, the battery capacity of the device B is 400, the battery capacity of the device C is 500, and the battery capacity of the device D is 200, the control device may differently set the screen brightness of the notification output in accordance with the remaining battery capacity. For example, the visual notification may be provided by setting the screen brightness of the device C having the largest remaining battery capacity to 7 and setting the screen brightness of the other devices to 3. Since the same purpose can be achieved using a device having a large battery capacity, the battery consumption of a device having a low battery capacity can be reduced and thus the use time of the devices can be increased.

FIG. 12 is a view illustrating a notification output method of a plurality of devices according to another embodiment of the present invention.

In FIG. 12, a device A represents a mobile device such as a smart phone, and a device B represents a wearable device such as a smart watch. Also, a device C represents a wearable device such as arm band/wrist band, and a device D represents a wearable device such as a smart necklace. As shown in FIG. 12, when a user holds/wears the device A, the device B, the device C, and the device D, the devices may output a vibration notification in accordance with the battery condition. That is, when the wearable device and the mobile device are within a certain distance and thus both devices can transmit information to a user, the control device may control the notification output of the devices.

As shown in FIG. 12, when the battery capacity of the device A is 1000, the battery capacity of the device B is 700, the battery capacity of the device C is 500, and the battery capacity of the device D is 300, the control device may sequentially output an auditory notification from a device having the largest remaining battery capacity to a device having the smallest remaining battery capacity. For example, in FIG. 7, the device A may output an auditory notification at the time T1 to T2, and the device B may output an auditory notification at the time T2 to T3. Also, the device C may output an auditory notification at the time T3 to T4, and the device D may output an auditory notification after the time T4. However, when the auditory notification is confirmed by a user, the auditory notification can be stopped. For example, when the device B receives a user input such as a touch input while the device B is providing an auditory notification, the device C and the device D may not provide auditory notifications.

FIG. 13 is a view illustrating a notification output method of a plurality of devices according to another embodiment of the present invention.

In FIG. 13, a device A represents a mobile device such as a smart phone, and a device B represents a wearable device such as a smart watch. Also, a device C represents a wearable device such as arm band/wrist band, and a device D represents a wearable device such as a smart necklace. As shown in FIG. 13, when a user holds/wears the device A, the device B, the device C, and the device D, the devices may output a vibration notification in accordance with the battery condition. That is, when the wearable device and the mobile device are within a certain distance and thus both devices can transmit information to a user, the control device may control the notification output of the devices.

As shown in FIG. 13, when the battery capacity of the device A is 300, the battery capacity of the device B is 400, the battery capacity of the device C is 500, and the battery capacity of the device D is 200, the control device may differently set the sound volume of the auditory notification in accordance with the remaining battery capacity. For example, the auditory notification may be provided by setting the sound volume of the device C having the largest remaining battery capacity to 7 and setting the sound volume of the other devices to 3. Since the same purpose can be achieved using a device having a large battery capacity, the battery consumption of a device having a low battery capacity can be reduced and thus the use time of the devices can be increased.

FIG. 14 is a graph illustrating a notification output control of a plurality of devices according to an embodiment of the present invention.

In FIG. 14, the horizontal axis represents time, and the vertical axis represents the intensity of the notification output.

In an embodiment of the present invention, the control device may control the amplitude, order, period, etc. of the notification output according to the state values of the communication-connected devices. The state values of the devices may be values obtained by combining at least one state of the battery capacity, the remaining battery amount, the battery charge frequency, the battery consumption efficiency, the battery sustainable time, the device distance (distance between devices, distance between a device and a user), an attachment state of a device to a user's body (e.g., vibration sensitivity differs according to a user's body position, and thus the increase and decrease of vibration intensity are possible), a storage state, a holding state, a mounting state, a tactile output type (e.g., up-and-down vibration).

As in the embodiment of FIG. 14A, the control device may provide a notification only to device A having a high state value. As in the embodiment of FIG. 14B, the control device may alternately use the device A having a state value of 80 and the device B having a state value of 30 to provide a notification, and may control the notification provision time of the device A to be longer than the notification provision time of the device B. As in the embodiment of FIG. 14C, the control device may simultaneously use the device A having a state value of 80 and the device B having a state value of 30 to provide a notification, and may set the notification strength (vibration intensity, display brightness, sound volume, etc.) of the device A having a larger state value to be higher. As in the embodiment of FIG. 14D, the control device may alternately use the device A having a state value of 80 and the device B having a state value of 30 to provide a notification, and may set the notification strength (vibration intensity, display brightness, sound volume, etc.) of the device A having a larger state value to be higher.

FIG. 15 is a flowchart illustrating a notification output method of a plurality of devices according to an embodiment of the present invention.

The control device may recognize a notification event (S15010). The control device may also recognize the notification events of the communication-connected external devices as well as the notification event of the control device. The control device may receive a message about a notification event notification or a notification event even when a notification event in regard to paired external devices occurs. Thus, according to an embodiment, the control device may also be pre-paired with devices that are to provide notification outputs. The notification events represent various events such as mail arrival, SNS update, message arrival, and phone reception which need to be notified to a user.

When a notification event occurs (S15010), the control device may determine whether or not there are devices capable of providing a notification output (S15020). The control device may determine whether or not there are communication-connected devices and whether or not the devices can provide a notification. As described above, the confirmation of the device capable of outputting a notification and the pairing operation (S15020) may also be performed prior to the notification event occurrence operation (S15010).

Then, the control device may determine whether or not a plurality of devices satisfy the corresponding output conditions (S15030), and may determine the output state of the devices when the corresponding output conditions are satisfied (S15040).

The corresponding output conditions among the plurality of devices that provide an output include general concepts such as distance, angle, location, and state which enable recognition of visual, auditory, and tactile notifications. That is, the corresponding output conditions may indicate whether the output units of the plurality of devices are in a complementary/alternative relationship to each other. For example, the corresponding output conditions indicate a condition about whether or not a notification output of one device can replace notification outputs of other devices.

The output state of the device may be determined like the embodiments described in FIGS. 2 to 14. The output state may indicate the output device, whether to output, the output order, and the output intensity distribution. The output state may be values using at least one or a combination of the battery capacity, the remaining battery amount, the battery charge frequency, the battery consumption efficiency, the battery sustainable time, the device distance (distance between devices, distance between a device and a user), attachment/holding/mounting states of a device to a user's body, and states such as a tactile output type (e.g., up-and-down vibration). When the output states such as whether to output, output order, and output intensity distribution are determined, the output unit of at least one device may be activated.

When it is determined that a notification outputted from a specific device has been delivered to a user (e.g., when a user touch is received on the screen on which the display information is displayed), the control device may inactivate the notification output of the devices to save resources as much as possible.

In the above-mentioned embodiments, a method of controlling the intensity, time, etc. of the notification output based on the state of batteries of the devices communication-connected to the control device has been described. Hereinafter, a method of controlling the notification output according to the battery state will be described in more detail. Hereinafter, a method of controlling a wearable device by a mobile device that is a control device will be described as an example, but the type of device is not necessarily limited by this embodiment. A smart watch may be described as an example of a wearable device.

FIG. 16 is a flowchart illustrating a notification output method of a mobile device according to an embodiment of the present invention.

FIG. 16 is a flowchart illustrating the embodiment of FIG. 15 in more detail. That is, the flowchart of FIG. 16 corresponds to a flowchart describing in more detail the operations (S15010 to S15040) of FIG. 15.

The mobile device may recognize the occurrence of a notification event (S16010). The notification event indicates an event that a device outputs a visual/audible/tactile notification according to an application setting and a user setting. The notification event may also occur in a mobile device or in a paired wearable device. When a notification event occurs in the wearable device, the mobile device may receive the event occurrence and the event content from the wearable device.

When a notification event occurs, the mobile device may check the battery state of communication-connected devices (S16020). The mobile device may receive the present battery remaining amount of the communication-connected devices according to a predetermined protocol. The battery capacity or the remaining battery amount of the devices may be transmitted to the control device as battery state information. The battery state information may be received when a notification event occurs, or may be received at a predetermined time interval.

The battery state check of the mobile device may be performed whenever a notification event occurs, or may be performed at a specific time interval. For example, when a plurality of notification events continuously occur in a mobile device at a very short time interval, receiving of battery state information each time may become a waste of processing and communication resources. Accordingly, when the time interval of occurrence of the event is smaller than a preset time interval, the control device may omit reception of the battery information, and may check the battery state based on the received information. According to the embodiments, the battery state check may also be performed at a preset interval. When the notification event occurrence interval is equal to or less than a preset time, the battery state check is omitted, and the mobile device may output a notification according to the notification output method determined in the preceding event.

The mobile device may determine whether a difference between the battery remaining amount of the mobile device and the battery remaining amount of a communication-connected wearable device is greater than or less than a predetermined threshold value (S16030). If the difference between the battery remaining amount of the mobile device and the battery remaining amount of the wearable device is equal to or greater than a present threshold value, the procedure may enter the battery balancing mode, and the notification output method may be determined (S16040). If the difference between the battery remaining amount of the mobile device and the battery remaining amount of the wearable device is less than a present threshold value, the procedure may enter the efficient notification mode, and the notification output method may be determined (S16050). Then, the mobile device may output the notification using at least one device selected according to the determined notification output method (S16060).

The present invention proposes a method of determining the notification output method on the basis of the comparison of the remaining battery amount, comparing the battery difference between the devices, and determining the notification output method in the different modes according thereto.

First, as a case where a difference in remaining battery amount between devices is large, the determining of the notification output method in a battery balancing mode (S16040) will be described. When there is a large difference between the remaining battery amounts, the notification output method need to be determined so as to prevent a device having a low battery level from being inactivated. That is, it is advantageous for a device having a larger remaining battery amount to preferentially output a notification so as to adjust the balance of the remaining battery amount. The mobile device in the battery balancing mode may selectively determine a notification output device, and may not redundantly output the notification. The battery balancing mode is a mode that preferentially considers the extension of the use time of the control device (mobile device) and the paired device (wearable device).

In the battery balancing mode, the mobile device ignores a user's behavior/settings and considers only the battery state to determine the notification provision method. In the balancing mode, the mobile device may basically output a notification to a device with a larger remaining battery amount. However, in another embodiment, it is also possible to determine the notification output method by preferentially considering the remaining battery amount of the wearable device having a small battery capacity. For example, the control device may determine the notification output method such that a) when the remaining battery amount of the wearable device is equal to or less than a preset threshold value, a notification is outputted to the mobile device, and b) when the remaining battery amount of the wearable device exceeds the preset threshold value, a notification is outputted to the wearable device.

Next, as a case where a difference in remaining battery amount between devices is small, the determining of the notification output method in the efficient notification mode (S16050) will be described. The efficient notification mode is a mode that preferentially considers efficiency of notification delivery rather than the amount of battery. That is, in the efficient notification mode, the control device may select the notification output device by preferentially considering the transmission efficiency of notification to a user. This is because since the difference of the remaining battery amount is small, the output of the notification using any device does not significantly affect the device usage time. Accordingly, in the efficient notification mode, a plurality of devices may simultaneously output notifications unlike the battery balancing mode.

In an embodiment, based on whether or not a device is worn, the control device may output a notification to the wearable device when a user wears the wearable device. When a user does not wear the wearable device, the control device may output a notification to the mobile device. Alternatively, the notification output device and the notification duration may be determined according to user settings. In the efficient notification mode, the device may determine the notification output method based on user's behaviors (e.g., whether or not a user wears the device) or based on user's settings. In an embodiment, both devices may output a notification in the efficient notification mode when the remaining battery amounts of the mobile device and the wearable device are equal to or greater than a certain threshold value.

FIG. 17 is a view illustrating a method of controlling the notification output intensity of a control device according to an embodiment of the present invention.

In the battery balancing mode and the efficient notification mode shown in FIG. 16, the control device may adjust the strength of the notification output based on the remaining battery amount.

The notification of the device is outputted with the output intensity such as the sound volume for auditory notification, the brightness of the screen for visual notification, and the vibration intensity for tactile notification. The device may output a notification at an intensity between the basic output intensity and the maximum output intensity.

As shown in FIG. 16A, when the remaining battery amount of the device is full, the basic output intensity of the notification output may be set high and the maximum output intensity may also be set high. However, as shown in FIGS. 16A, 16B, and 16C, as the remaining battery amount decreases, the basic output intensity may be further reduced, and the maximum output intensity may also be reduced.

The control device may determine the allowable minimum/maximum output intensity according to the remaining battery amount, and thus a user's lowest recognition threshold may also be changed. The present invention may consider a relative difference of batteries between at least two devices in providing efficient notification in regard to the same notification that occurs in at least two paired devices of a user. Accordingly, the present invention can maximally save the remaining battery amount, thereby maintaining the maximum allowable output intensity to the maximum and thus allowing a Noti to be smoothly delivered to a user.

The present invention may preferentially consider a relative battery difference of two or more devices in providing notifications for two or more user devices, thereby selectively providing a notification only to a specific device or providing notifications to all of two or more devices. When providing notifications to two or more devices, the devices may provide notifications simultaneously or sequentially. When a notification is selectively provided, the control device may control the notification output according to two modes, that is, the battery balancing mode that saves the battery according to the relative battery difference, or the efficient notification mode that optimally notifies a user.

Hereinafter, the operation of the present invention will be additionally described by illustrating the GUI of the device on which an application executing the present invention is run. In the following embodiments, it will be described as an example that the remaining battery amount difference between the devices, by which the control device determines the notification output mode, is about 20%. Hereinafter, the notification output method of a plurality of devices as shown in FIGS. 15 and 16 may be referred to as a smart notification function.

FIG. 18 is a view illustrating a Graphic User Interface (GUI) of a control device performing a notification output method according to an embodiment of the present invention.

In FIG. 18, the mobile device is illustrated as a smart phone (SAMSUNG SM-N910S), and the wearable device is illustrated as a smart watch (LGE G WATCH R). FIG. 18A is a view illustrating a GUI for checking a relative battery difference between the mobile device and the wearable device, and FIG. 18B is a view illustrating a GUI for determining a notification providing device.

In FIG. 18, the GUI according to this embodiment includes a device configuration interface 18010 showing devices communication-connected to a control device and capable of outputting a notification, a battery state display interface 18020 indicating the battery state of devices, and a smart notification setting interface 18030 indicating whether to use the notification output method, i.e., the smart notification.

In the embodiment of FIG. 18A, the remaining battery amount of the mobile device indicated by the battery state display interface 18010 is 36%, and the remaining battery amount of the wearable device is 13%. In the smart notification setting interface 18030 of FIG. 18A, the notification output method of the present invention is activated by positioning a smart notification button to the right side, and the notification output method of the present invention is inactivated by positioning the button to the left side. Whether or not the notification output method of the present invention is activated may be set by a user, or may be automatically set according to the battery state. For example, as described above, the control device may be set to automatically activate the notification output method when the difference between the remaining battery amounts is equal to or greater than a reference value. The embodiment of FIG. 18 shows a case where the smart notification function is activated (18030).

In the embodiment of FIG. 18, since the difference between the remaining battery amounts of the mobile device and the wearable device is 23% equal to or larger than a preset threshold (20%), the control device enters the battery balancing mode. Accordingly, the control device may determine the notification output device based on the remaining battery amount. Accordingly, the control device may determine to output a notification using the mobile device having a larger remaining battery amount, and may display the determined notification output device through the notification device display interface 10840. Also, the control device may provide a notification device display interface 18050 informing that the notification output device has been determined as a mobile device to the wearable device.

In the embodiment of FIG. 18B, as described above, when the remaining battery amount of the smart watch is smaller than a preset threshold (e.g., 20%), the control device may set the mobile device as the notification output device.

In the battery balancing mode, the control device may selectively determine the notification providing device based on a capacity difference of the battery. The notification output method of the notification providing device may be determined according to the state of the device. For example, the notification providing method of the device may be determined based on the device holding/wearing state of a user, the usage method (screen-on, grip, calling, carrying in bag, etc.). Alternatively, a notification may also be outputted according to a preset notification provision method.

FIG. 19 is a view illustrating a GUI of a control device performing a notification output method according to an embodiment of the present invention.

In FIG. 19, the same description as FIG. 18 will be omitted.

In the embodiment of FIG. 19, a smart notification setting interface 19010 indicates that smart notification is set not to be used. Accordingly, the control device may output a notification to both the mobile device and the wearable device regardless of the difference in the remaining battery amount. The control device may provide notification device display interfaces 19020 and 19030, informing that the notification is outputted to both the mobile device and the wearable device, to the mobile device and the wearable device.

When the smart notification is set to be used, in the embodiment of FIG. 19, since the difference between the remaining battery amount (31%) of the smart phone and the remaining battery amount (13%) of the smart watch is 18% and thus less than a preset reference (20%), the control device may output notifications using both devices in the efficient notification mode. When the battery difference is small but the remaining battery amount of the smart watch having a low battery capacity is smaller than the remaining battery amount of the mobile phone, the control device may pattern the Noti output for both devices. For example, a notification may be outputted by determining the pattern period, the output order, the pattern strength, and the type of notification output modality, such as a method of applying a short tactile feedback to the wearable device and then providing a visual feedback to the display of the smartphone.

FIG. 20 is a view illustrating a Graphic User Interface (GUI) of a control device performing a notification output method according to an embodiment of the present invention.

In FIG. 20, the same description as FIGS. 18 and 19 will be omitted.

In the embodiment of FIG. 20, the remaining battery amount of the mobile device is 31%, and the remaining battery amount of the wearable device is 50%. Also, the remaining battery amount of the wearable device exceeds a preset threshold (20%). Accordingly, since the difference (19%) of the remaining battery amount is less than a preset reference (20%), the control device enters the efficient notification mode. Based on the other sensor information, a device capable of efficiently transmitting a notification to a user is selected. In the embodiment of FIG. 20, the wearable device is determined as an optimum device that can notify a user of a notification. Accordingly, the control device may determine to output a notification to the wearable device, and may provide an interface for notifying of the outputting of the notification.

When a relative difference between the remaining battery amounts is small and the battery of the wearable device that is worn is also equal to or more than a certain remaining amount, the control device may output a notification so as to notify a user in the shortest time using the wearable device. For example, the control device may output a notification at a high intensity/high resolution/high frequency from the beginning of the notification output, and may use all the methods to optimally deliver the notification until a user's confirmation input is recognized. This is because it is more advantageous for a user's recognition that a Noti is provided by the wearable device when the remaining battery amount of the wearable device is larger than that of the mobile device.

In an embodiment, the control device may edit the notification content to be outputted. When the remaining battery amount of the device to output by the remaining battery amount is also equal to or less than a preset capacity, the control device may edit and provide the notification contents. For example, the control device may summarize and provide the notification contents such that the notification output device can save battery power.

The method of editing and summarizing the notification contents may be various. For example, the control device may delete images included in the notification contents and edit only the text to output notification contents. Alternatively, a keyword extraction function may be applied to the text, and thus a shortened keyword-based notification may be provided.

By providing shortened notification contents, it is possible to shorten the notification provision time itself. For example, when contents are scrolled together with feedback, the scroll time of the contents may be shortened. Accordingly, battery consumption can be additionally reduced through the content editing. Particularly, in the case of a wearable device having a small screen size, since a display need to be turned on for a long time even to provide a small amount of contents, the battery saving effect due to content compression may be more significant.

The content editing function may be activated when the battery state of the notification providing device is less than a preset threshold. The threshold value, which serves as an activation criterion of the content editing function, may vary according to the battery capacity and remaining battery amount of the notification providing device. In addition, the threshold value, which is an activation criterion of the content editing function, may be set to a smaller value for a device having a small screen size.

FIG. 21 is a view illustrating a configuration of a control device according to an embodiment of the present invention.

The control device of FIG. 21 may correspond to a mobile device, but various portable devices and wearable devices may correspond to the control device.

The mobile device includes a display unit 21010, a communication unit 21020, a processing unit 21030, a notification output unit 21040, and a memory unit 21050.

The display unit 21010 may display various kinds of Graphical User Interface (GUI) and visual notifications. The display unit 21010 may correspond to a display screen, or may be provided together with other sensor units. According to the embodiments, the display unit 21010 may correspond to a notification output unit.

The communication unit 21020 may connect to various communication networks to perform communication with external devices. In this embodiment, the communication unit 21020 may transmit battery-related data (e.g., battery state information) and notification data to external devices, or may receive battery-related data and notification data from external devices.

The notification output unit 21040 may output a notification event. The notification output unit 21040 may output at least one of a visual notification, an auditory notification, and a tactile notification. According to the type of each notification, the notification output unit 21040 may correspond to a display unit, a speaker, and a vibration output unit. In FIG. 21, the notification output unit 21040 may be considered as a logical configuration including at least one of a display unit, a speaker, and a vibration output unit.

The memory unit 21050, which is a volatile/non-volatile memory device, may store various digital data. The memory unit 21050 may store data for executing an application, and may store sensor data and task data.

The processing unit 21030 may read/execute various digital data stored in the memory unit 21050. Also, the processing unit 12030 may control at least one of the display unit 21010, the communication unit 21020, the processing unit 21030, the sensor unit 12040, and the memory unit 12050.

Although not shown in FIG. 21, the mobile device may include a sensor unit. The sensor unit may include at least one sensor, and may provide sensor data to the processing unit 21030. The sensor unit 21040 may include at least one of a motion sensor such as an acceleration sensor, a linear acceleration sensor, a gyroscope, a gravity sensor, a rotation vector sensor, a step counter sensor and a step detector sensor, a position sensor such as an orientation sensor and proximity sensor, a magnetic sensor and a geomagnetic sensor, and an environmental sensor such as a temperature sensor, an optical sensor, a pressure sensor and a humidity sensor. The motion sensor, the position sensor, and the environmental sensor may be classified into different types of sensors, respectively. Although the sensor unit may be shown as one block in FIG. 21, the sensor units may be provided in plurality according to the type, position, and number of sensors as described above.

The processing unit 12030 according to an embodiment may control other units to perform the methods of the embodiments described above. The processing unit 12030 may implement the methods according to the embodiments by driving application/software for performing the methods.

It will be apparent to those skilled in the art that various modifications and variations can be made without departing from the spirit or scope of the present invention. Therefore, it is intended that the present invention cover the modifications and variations provided within the scope of the appended claims and their equivalents.

The device and method inventions are all referred to in this specification, and the description of both device and method inventions can be supplemented and applied to each other.

MODE FOR INVENTION

Various embodiments have been described in the best mode for carrying out the invention.

INDUSTRIAL APPLICABILITY

The invention can be used in the fields of mobile devices and control methods.

It will be apparent to those skilled in the art that various modifications and variations can be made without departing from the spirit or scope of the present invention. Therefore, it is intended that the present invention cover the modifications and variations provided within the scope of the appended claims and their equivalents.

The invention claimed is:

1. A notification output method of a mobile device, the method comprising:
recognizing an occurrence of a notification event;
identifying at least one wearable device communication-connected to the mobile device and capable of outputting a notification;
checking a battery state of the mobile device and a battery state of the at least one wearable device; and
outputting a notification using at least one of the mobile device and the at least one wearable device based on the battery states,
wherein the checking of the battery state further comprises determining whether or not a difference between the remaining battery amount of the mobile device and the remaining battery amount of the at least one wearable device is equal to or greater than a second threshold,
wherein the method further comprising entering a battery balancing mode and determining a notification output method when the difference between the remaining battery amounts is equal to or greater than the second threshold, and entering an efficient notification mode and determining a notification output method when the difference between the remaining battery amounts is less than the second threshold, wherein the battery balancing mode is a mode that preferentially considers extension of the usage time of the mobile device and the wearable device, and the efficient notification mode is a mode that preferentially considers transmission efficiency of the notification to a user.

2. The method of claim 1, wherein the outputting of the notification comprises outputting a notification to a device having a largest remaining battery amount.

3. The method of claim 1, wherein the outputting of the notification comprises setting an output order of a plurality of devices based on a remaining battery amount and outputting a notification according to the set order.

4. The method of claim 1, wherein the outputting of the notification comprises outputting a notification at different intensities by each of devices according to a remaining battery amount.

5. The method of claim 1, comprising stopping the outputting of the notification when a user input corresponding to the outputting of the notification is received by the mobile device and the at least one wearable device.

6. The method of claim 1, further comprising editing notification contents to be outputted when a remaining battery amount of the device that outputs the notification is less than a first threshold.

7. The method of claim 6, wherein a notification output time is shortened by using the edited notification contents.

8. The method of claim 1, wherein in the battery balancing mode, the notification is outputted using the mobile device or the wearable device.

9. The method of claim 1, wherein in the efficient notification mode, the notification is outputted using at least one of the mobile device and the wearable device.

10. The method of claim 1, upon the entering of the battery balancing mode, comprising:
determining whether the remaining battery amount of the wearable device is equal to or greater than a third threshold; and
outputting a notification to a device having a larger remaining battery amount among the mobile device and the wearable device when the remaining battery amount of the wearable device is equal to or greater than the third threshold, and outputting a notification to the mobile device when the remaining battery amount of the wearable device is less than the third threshold.

11. The method of claim 1, wherein the battery state indicates at least one of battery capacity, remaining battery amount, charge frequency, power efficiency or battery sustainability time.

12. A mobile device comprising:
a communication unit performing communication with at least one wearable device capable of outputting a notification;
a notification output unit outputting a notification event; and
a memory unit storing digital data, and
the mobile device controlling the communication unit, the notification output unit, and the memory unit to output a notification, and
wherein the mobile device:
recognizes an occurrence of a notification event;
identifies at least one wearable device communication-connected to the mobile device and capable of outputting a notification;
checks a battery state of the mobile device and a battery state of the at least one wearable device by determining whether or not a difference between the remaining battery amount of the mobile device and the remaining battery amount of the at least one wearable device is equal to or greater than a second threshold;
enters a battery balancing mode and determining a notification output method when the difference between the remaining battery amounts is equal to or greater than the second threshold, and entering an efficient notification mode and determining a notification output method when the difference between the remaining battery amounts is less than the second threshold; and
outputs a notification using at least one of the mobile device and the at least one wearable device based on the battery states,
wherein the battery balancing mode is a mode that preferentially considers extension of the usage time of the mobile device and the wearable device, and the efficient notification mode is a mode that preferentially considers transmission efficiency of the notification to a user.

13. The mobile device of claim 12, wherein an output order of a plurality of devices is set based on a remaining battery amount and a notification is outputted according to the set order.

14. The mobile device of claim 12, wherein the outputting of the notification is stopped when a user input corresponding to the outputting of the notification is received by the mobile device and the at least one wearable device.

15. The mobile device of claim 12, wherein notification contents to be outputted are edited when a remaining battery amount of the device that outputs the notification is less than a first threshold, and a notification output time is shortened by using the edited notification contents.

16. The mobile device of claim 12, wherein in the battery balancing mode, the notification is outputted using the mobile device or the wearable device, and in the efficient notification mode, the notification is outputted using at least one of the mobile device and the wearable device.

17. The mobile device of claim 12, upon the entering of the battery balancing mode:
determining whether the remaining battery amount of the wearable device is equal to or greater than a third threshold; and
outputting a notification to a device having a larger remaining battery amount among the mobile device and the wearable device when the remaining battery amount of the wearable device is equal to or greater than the third threshold, and outputting a notification to the mobile device when the remaining battery amount of the wearable device is less than the third threshold.

18. The mobile device of claim 12, wherein the battery state indicates at least one of battery capacity, remaining battery amount, charge frequency, power efficiency and battery sustainability time.

* * * * *